US007646931B2

(12) United States Patent
Liu et al.

(10) Patent No.: US 7,646,931 B2
(45) Date of Patent: *Jan. 12, 2010

(54) AUTOMATIC ANALYSIS AND ADJUSTMENT OF DIGITAL IMAGES WITH EXPOSURE PROBLEMS

(75) Inventors: Min Liu, Redmond, WA (US); Po Yuan, Renton, WA (US); Richard S. Turner, Jr., Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,509

(22) Filed: Feb. 14, 2008

(65) Prior Publication Data

US 2008/0137986 A1    Jun. 12, 2008

Related U.S. Application Data

(63) Continuation of application No. 10/400,593, filed on Mar. 26, 2003, now Pat. No. 7,359,572.

(51) Int. Cl.
*G06K 9/40* (2006.01)
*G06K 9/00* (2006.01)
*G09G 5/02* (2006.01)
*H04N 5/202* (2006.01)
*H04N 1/40* (2006.01)

(52) U.S. Cl. .................. 382/274; 382/168; 345/589; 348/254; 358/461

(58) Field of Classification Search ............... 382/274, 382/168; 345/589; 348/254; 358/461
See application file for complete search history.

(56) References Cited

U.S. PATENT DOCUMENTS 5,339,368 A    8/1994    Higgins-Luthman et al.
5,583,656 A *  12/1996   Gandhi et al. ............... 382/234

(Continued)

OTHER PUBLICATIONS

Gonzalez et al., "Digital Picture Processing," 2nd ed., Sections 3.1-3.4, Prentice-Hall, 2002, pp. 75-116.

(Continued)

*Primary Examiner*—Brian P Werner
*Assistant Examiner*—Kathleen S Yuan
(74) *Attorney, Agent, or Firm*—Klarquist Sparkman, LLP

(57) ABSTRACT

Techniques and tools for analyzing and adjusting the exposure of digital images are described. For example, a computer processes a digital image by analyzing exposure data, assigning an image classification (e.g., StretchNeeded, UnderExposed, OverExposed, or Normal) based on the analysis, and selecting an exposure compensation technique (e.g., histogram stretch, positive gamma curve, negative gamma curve, or no adjustment) based on the image classification. The exposure data can be luminance values for pixels in the digital image represented in a histogram. The computer can produce transform data comprising a transformation of the exposure data according to the selected exposure compensation technique. The computer can store transform data in a look-up table and can store the look-up table in the digital image file. The described techniques and tools can be implemented as a feature of an operating system environment and can be activated responsive to user action via a user interface.

12 Claims, 14 Drawing Sheets

U.S. PATENT DOCUMENTS

| | | | |
|---|---|---|---|
| 5,818,975 A | | 10/1998 | Goodwin et al. |
| 5,862,218 A | * | 1/1999 | Steinberg .................. 713/176 |
| 5,874,988 A | * | 2/1999 | Gu .............................. 348/97 |
| 6,009,209 A | | 12/1999 | Acker et al. |
| 6,195,467 B1 | | 2/2001 | Asimopoulos et al. |
| 6,301,440 B1 | | 10/2001 | Bolle et al. |
| 6,603,886 B1 | | 8/2003 | Matama |
| 6,608,650 B1 | | 8/2003 | Torres et al. |
| 6,650,774 B1 | | 11/2003 | Szeliski |
| 6,687,400 B1 | | 2/2004 | Szeliski |
| 6,766,263 B1 | | 7/2004 | Stokes |
| 6,930,718 B2 | | 8/2005 | Parulski et al. |
| 2002/0061142 A1 | * | 5/2002 | Hiramatsu ................. 382/254 |
| 2003/0012448 A1 | * | 1/2003 | Kimmel et al. ............ 382/274 |
| 2003/0156196 A1 | * | 8/2003 | Kato et al. ............... 348/207.2 |
| 2003/0174886 A1 | | 9/2003 | Iguchi et al. |
| 2004/0252217 A1 | | 12/2004 | Battles et al. |

OTHER PUBLICATIONS

Rosenfeld et al., "Digital Picture Processing," vol. 1, 2nd ed., Sections 6.1-6.2, Academic Press, Inc., 1982, pp. 209-237.
Adobe Systems, Inc., "Adobe Photoshop Album: Product Overview," 2 pp. (downloaded from the World Wide Web on Feb. 27, 2003).
Apple Computer, Inc., "iPhoto2: Picture Your Digital Lifestyle," 3 pp. (downloaded from the World Wide Web on Feb. 27, 2003).
Apple Computer, Inc., "Fine Tune Your Photos," 2 pp. (downloaded from the World Wide Web on Feb. 27, 2003).
Ashikhmin, "A Tone Mapping Algorithm for High Contrast Images," *Eurographics Workshop on Rendering*, pp. 1-11 (Jun. 2002).
Dardier et al., "Automatic Out of Range Photo Recognition Using Digital Techniques," *International Symposium on Electronic Image Capture and Publishing*, 11 pp. (draft document dated Apr. 1998).
Dardier et al., "Enhancement of Improperly Exposed Photographic Color Negatives", *IS&T/SPIE's 2nd Annual Symposium on Electronic Imaging: Science & Technology*, 13 pp. (Jan. 1999).
Fattal et al., "Gradient Domain High Dynamic Range Compression", *ACM SIGGRAPH 2002*, 8 pp. (2002).
"Filtering and Enhancing Images", *Computer Vision*, pp. 145-150 (Mar. 2000).
Fridrich, "Robust Bit Extraction from Images," IEEE International Conference on Multimedia Computing and Systems, 5 pp. (1999).
Jack, *Video Demystified*, Ch. 3 ("Color Spaces"), pp. 15-34, 3d ed. (2001).
Jaimes et al., "Improving Quality of Digital Images of Art in Museum Collections," *IS&T Image Processing, Image Quality, Image Capture, Systems Conference (PICS)*, Montreal, Canada, 5 pp. (Apr. 2001).
Jobson et al., "Retinex Image Processing: Improved Fidelity to Direct Visual Observation," *Proc. 4th Color Imaging Conf.: Color Science, Systems & Applications*, 4 pp. (Nov. 1996).
Mann, "Comparametric Equations with Practical Applications in Quantigraphic Image Processing", *IEEE Transactions on Image Processing*, vol. 9, No. 8, pp. 1389-1405 (Aug. 2000).
Microsoft Corp., "WDM Still Image Architecture," 10 pp. (downloaded from the World Wide Web on Apr. 3, 2003; document dated Dec. 1998).
Microsoft Corp., "Windows Platform Design Notes: Supporting MetaData in Image Files Through GDI+," 13 pp. (Apr. 2000).
Microsoft Corp., "Microsoft® Windows® Platform Development: Still Image Connectivity for Windows," 7 pp. (downloaded from the World Wide Web on Apr. 2, 2003; document dated Dec. 2001).
Microsoft Corp., "Microsoft® Windows® Platform Development: Digital Still Camera Support," 2 pp. (downloaded from the World Wide Web on Apr. 2, 2003; document dated Dec. 2001).
Microsoft Corp., "Microsoft® Windows® Platform Development: MetaData in Image Files and GDI+," 2 pp. (downloaded from the World Wide Web on Apr. 2, 2003; document dated Dec. 2001).
Microsoft Corp., "Microsoft Knowledge Base Article 266348: Description of Windows Image Acquisition," 1 p. (downloaded from the World Wide Web on Apr. 2, 2003; document dated Jul. 2002).
Microsoft Corp., "Still Image: Data Acquisition Models," 2 pp. (downloaded from the World Wide Web on Apr. 3, 2003).
Microsoft Corp., "About Windows Image Acquisition," 1 p. (downloaded from the World Wide Web on Apr. 3, 2003).
Microsoft Corp., "Device Object," 2 pp. (downloaded from the World Wide Web on Apr. 3, 2003).
Microsoft Corp., "Objects," 1 p. (downloaded from the World Wide Web on Apr. 3, 2003).
Microsoft Corp., "How to Use Filters," 2 pp. (downloaded from the World Wide Web on Apr. 3, 2003).
Microsoft Corp., "About Microsoft Windows Image Acquisition Automation Layer," 3 pp. (downloaded from the World Wide Web on Apr. 3, 2003).
Microsoft Corp., "Windows Image Acquisition Automation Layer," 1 p. (downloaded from the World Wide Web on Apr. 3, 2003).
Microsoft Corp., "WIA Architecture Overview," 2 p. (downloaded from the World Wide Web on Oct. 21, 2005).
Niehues-Brooks et al., "Automated Digital Image Analysis of Video Ice Crystal Data," *Proc. ISCA 14th Int'l Conf. on Computers and Their Applications*, 4 pp. (1999).
Nijmeijer et al., "Correction of Lens-Distortion for Real-Time Image Processing Systems," *Proc. 1993 IEEE Workshop on VLSI Signal Processing*, vol. 6, pp. 316-324 (Oct. 1993).
Novak et al., "Estimating Scene Properties from Color Histograms," DARPA Image Understanding Workshop, 33 pp., Washington D.C. (1993).
Ojanen, "Automatic Correction of Lens Distortion by Using Digital Image Processing," (document dated Jul. 1999).
Robertson et al., "Dynamic Range Improvement Through Multiple Exposures," *Int'l Conf. on Image Processing*, Kobe, Japan, 5 pp. (Oct. 1999).
Scheel et al., "Tone Reproduction for Interactive Walkthroughs," *Eurographics 2000*, vol. 19, No. 3, 12 pp. (Aug. 2000).
Siebert, "Differential Invariants under Gamma Correction," *Vision Interface*, 8 pp. Montreal (2000).
Szummer et al., "Indoor-Outdoor Image Classification", *IEEE Int'l Workshop on Content-Based Access of Image and Video Databases*, 10 pp. (Jan. 1998).
Technical Standardization Committee on AV & IT Storage Systems and Equipment, "Exchangeable Image File Format for Digital Still Cameras: Exif Version 2.2," 146 pp., Japan Electronics and Information Technology Industries Association (Apr. 2002).
Tsin et al., "Statistical Calibration of CCD Imaging Process," *Proc. IEEE 2001 Int'l Conf. on Computer Vision*, 8 pp. (2001).
Microsoft Corp., "Microsoft® Windows® Platform Development: WIA Architecture," 6 pp. (downloaded from the World Wide Web on Apr. 2, 2003; document dated Dec. 2001).
Microsoft Corp., "IWiaData Transfer Interface," 2 pp. (downloaded from the World Wide Web on Apr. 3, 2003).
Microsoft Corp., "WIA Architecture," 1 p. (downloaded from the World Wide Web on Apr. 3, 2003).

* cited by examiner

Software 180 implementing tools for automatic analysis and adjustment of digital images

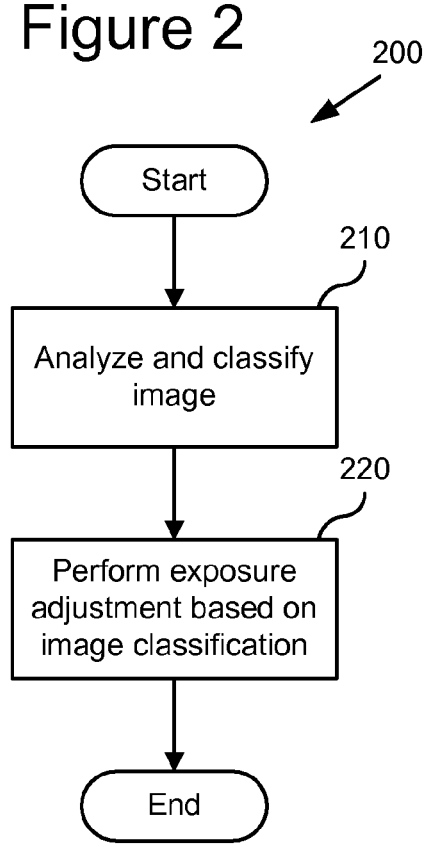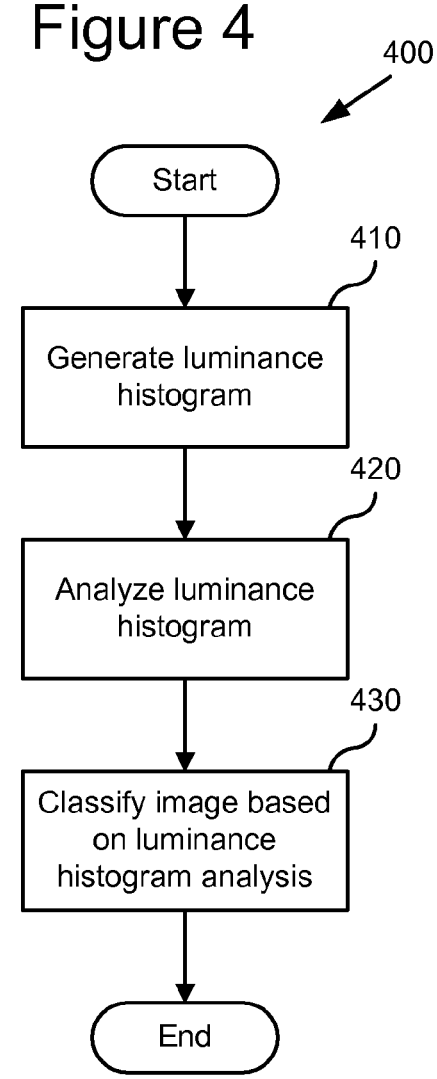

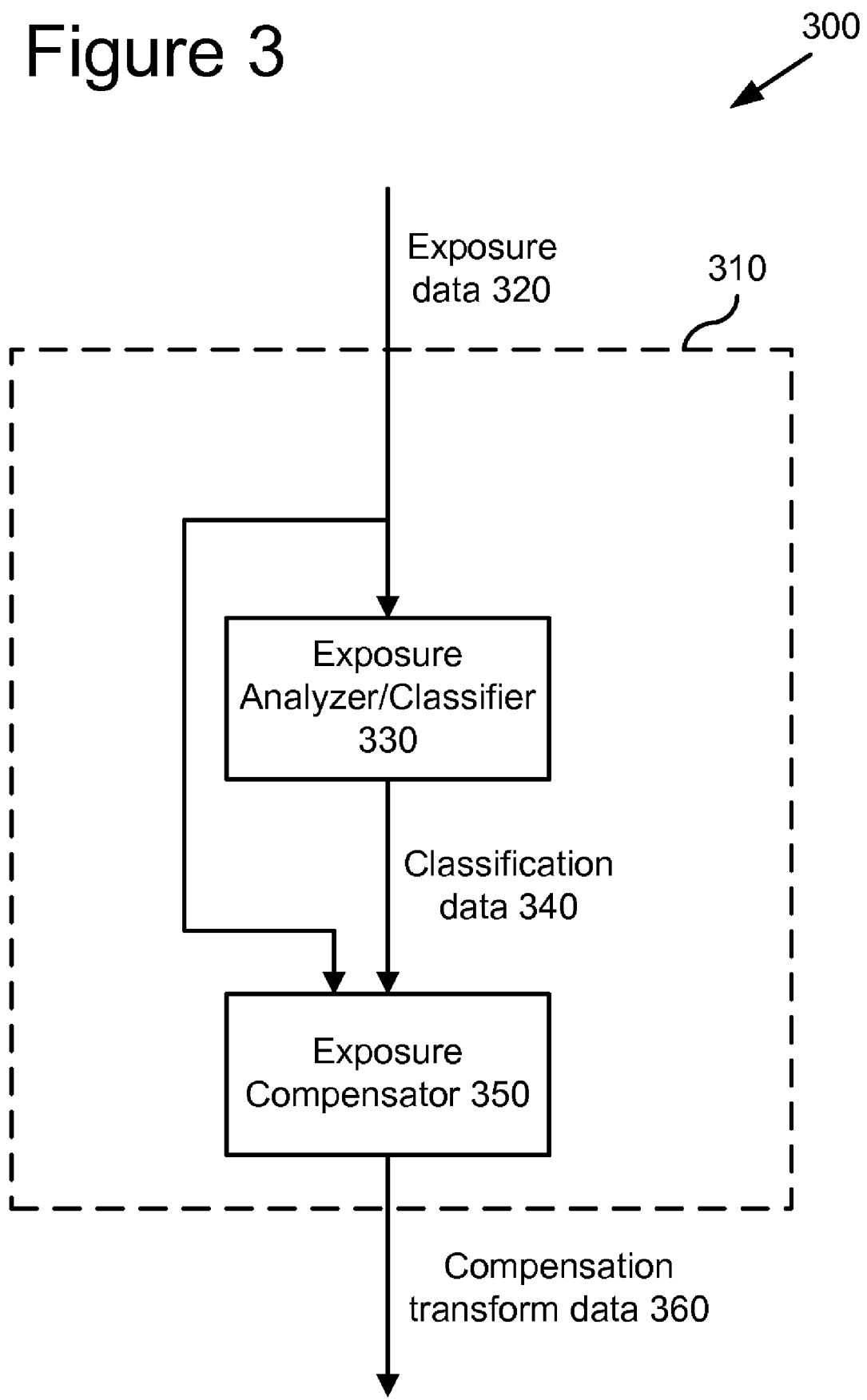

1900

Input values 1910  Output values 1920

| 255 | 255 |
| . . . | . . . |
| 79 | 144 |
| . . . | . . . |
| 0 | 0 |

2000

AUTOMATIC ANALYSIS AND ADJUSTMENT OF DIGITAL IMAGES WITH EXPOSURE PROBLEMS

CROSS REFERENCE TO RELATED APPLICATION

This application is a divisional of U.S. patent application Ser. No. 10/400,593, filed Mar. 26, 2003, which is incorporated herein by reference.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to processing of digital images, and more particularly relates to automatic analysis and adjustment of digital images with exposure problems.

BACKGROUND

Digital images from digital cameras and scanners are becoming more and more popular. However, most people don't take perfect photographs. It is estimated that the majority of consumer digital images have exposure problems. For example, the digital images may be too dark or too bright, mainly due to the limitations of existing digital camera sensors.

Today, users rely on imaging software to re-touch these digital images. Usually, these software packages provide adjustable scalars and curves for users to adjust images manually. Some packages promise automatic adjustment of some digital image characteristics.

Whatever the benefits of previous techniques, however, they do not have the advantages of the techniques and tools presented below.

SUMMARY

In summary, the detailed description is directed to various techniques and tools for analyzing and adjusting the exposure of digital images. For example, an application processes a digital image by analyzing exposure data for the digital image, assigning an image classification (e.g., StretchNeeded, UnderExposed, OverExposed, or Normal) to the digital image based on the analysis, and selecting an exposure compensation technique (e.g., histogram stretch, positive gamma curve, negative gamma curve, or no adjustment) for the digital image based on the image classification.

The exposure data can be luminance values for pixels in the digital image. Luminance values can be represented in a luminance value histogram.

The application can also produce transform data comprising a transformation of the exposure data for the digital image according to the selected exposure compensation technique. The application can produce transform data by, e.g., applying a histogram stretch approach for the digital image, or by applying a gamma curve (positive or negative) to the luminance value histogram.

The application can store transform data in a look-up table (e.g., a color table), and can store the look-up table in a file containing the digital image. For example, the application can store the look-up table in a metadata section of the file. Storing the transform data in a look-up table in the digital image file facilitates archiving an original version of the digital image.

The described techniques and tools can be implemented in an operating system environment as a feature of the operating system environment. The described techniques and tools can be activated responsive to user action via a user interface.

The various techniques and tools can be used in combination or independently. Different embodiments implement one or more of the described techniques and tools.

Additional features and advantages will be made apparent from the following detailed description of different embodiments that proceeds with reference to the accompanying drawings.

BRIEF DESCRIPTION OF THE DRAWINGS

FIG. 2 is a flow diagram showing analysis, classification, and exposure compensation for digital images.

FIG. 3 is a block diagram of an automatic exposure analysis and adjustment software architecture.

FIG. 4 is a flow diagram showing analysis of exposure data and classification of digital images based on the analysis of the exposure data.

DETAILED DESCRIPTION

Techniques and tools for automatically fixing exposure problems in digital images are described. The digital images can be color, grey-scale, or other types of images in a variety of formats. Some of the described techniques and tools facilitate an "auto-fix" scenario, where a single-button user command (e.g., a mouse click) triggers an automatic analysis and adjustment of the exposure of a digital image, thus freeing the user from a tedious learning and manual adjustment process. The process is divided into two major stages: the exposure analysis and classification stage, and the exposure compensation stage.

In the exposure analysis and classification stage, a luminance value histogram of a digital image is generated and analyzed, and the image is classified based on the analysis of the luminance histogram. Based on the image classification, different exposure adjustment methods can be employed in the exposure compensation stage to adjust the image.

Performance optimization techniques for automatic exposure adjustment are also described. For example, a technique used in the exposure adjustment process requires only a change in the color table of the images instead of changing the raster pixel values. This technique improves the performance of the adjustment process and also facilitates the preservation of the "digital negative" of a digital camera image by recording the adjustment in the color table.

The described tools can be implemented as an operating system feature or as a plug-in module, allowing the tools to be integrated into other applications.

I. Computing Environment

Figure 1:
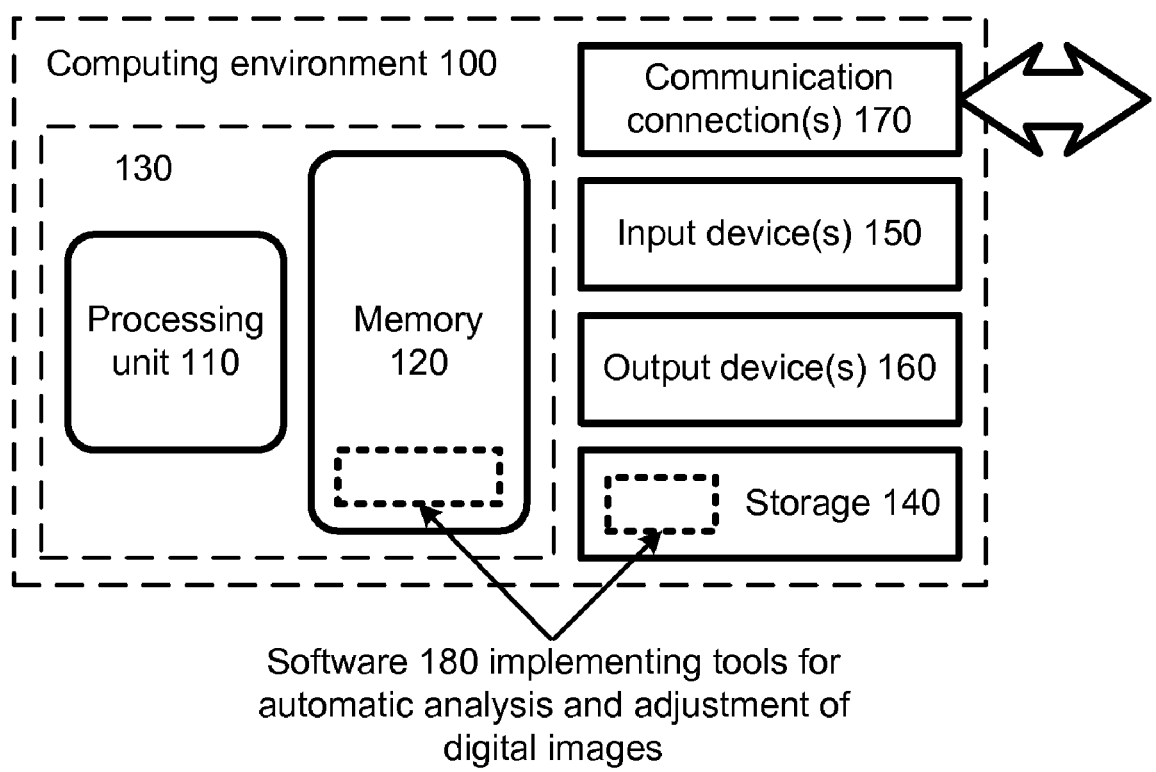
FIG. 1 is a block diagram of a suitable computing environment for implementing tools for automatic analysis and adjustment of digital images.

FIG. 1 illustrates a generalized example of a suitable computing environment 100 in which the described techniques and tools may be implemented. The computing environment 100 is not intended to suggest any limitation as to scope of use or functionality of the invention, as the present invention may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing tools for automatic analysis and adjustment of digital images.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. In some embodiments, operating system software includes tools for automatic analysis and adjustment of digital images. The computing environment desirably includes digital image processing hardware (e.g., a scanning device and/or digital camera) and software.

The storage 140 may be removable or non-removable, and includes magnetic disks, magnetic tapes or cassettes, CD-ROMs, CD-RWs, DVDs, or any other medium which can be used to store information and which can be accessed within the computing environment 100. The storage 140 stores instructions for the software 180 implementing tools for automatic analysis and adjustment of digital images.

The input device(s) 150 may be a touch input device such as a keyboard, mouse, pen, or trackball, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, digital image information, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment 100, computer-readable media include memory 120, storage 140, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "analyze," "select," "adjust," and "stretch" to describe computer operations in a computing environment. These terms are high-level abstractions for operations performed by a computer, and should not be confused with acts performed by a human being. The actual computer operations corresponding to these terms vary depending on implementation.

II. Automatic Analysis and Adjustment of Digital Images

As noted above, the automatic exposure analysis and adjustment process is divided into two major stages: the exposure analysis and classification stage, and the exposure compensation stage. Details of exposure analysis and classification, exposure compensation, and additional performance optimization techniques are described below.

FIG. 2 shows a basic technique 200 for automatically analyzing and adjusting exposure of digital images. First, in the exposure analysis and classification stage, the digital image is analyzed and classified at 210. Then, in the exposure compensation stage, the exposure of the image is adjusted based on the classification of the image at 220.

With reference to FIG. 3, a software architecture of an automatic exposure analysis and adjustment system 300 includes an automatic image analysis and adjustment module 310. The automatic image analysis and adjustment module 310 analyzes exposure data 320 (e.g., luminance values) from a digital image in exposure analyzer/classifier 330. Exposure analyzer/classifier 330 classifies the digital image based on analysis of the exposure data 320 and provides classification data 340 to exposure compensator 350. Based on the classification data 350, the exposure compensator 340 selects an appropriate technique for adjusting the luminance values for the digital image, performs the adjustment and outputs the results as compensation transform data 360.

A. Exposure Analysis and Classification

FIG. 4 shows a technique 400 used in the exposure analysis and classification stage for analyzing the exposure of digital images and classifying the digital images based on the analysis.

First, at 410, the analyzer/classifier 330 (FIG. 3) calculates the image luminance channel and generates a luminance histogram. In some embodiments, the analyzer/classifier converts an image (e.g., an image in JPEG format or some other format) from an RGB color space to a YUV color space and analyzes the luminance (Y) values of the pixels in the image. The image can be converted back into the RGB color space after any exposure compensation/adjustment has been performed. The luminance histogram is a representation of the statistical distribution of the luminance values of the image. The luminance histogram contains the number of occurrences of each luminance value among the pixels in the image. For an image with 8-bit color depth, the luminance values range from 0 to 255.

Then, at 420, the analyzer/classifier analyzes the luminance histogram, and classifies the image based on the luminance histogram analysis at 430.

1. Histogram Analysis

During analysis of the luminance histogram, the analyzer/classifier extracts parameters useful for classifying the exposure of the image. For example, calculating the effective width of the histogram is useful for determining whether the histogram should be stretched (i.e., whether the luminance values should be distributed more evenly across the range of possible values). Calculating the center and centroid of the histogram is useful for determining whether luminance values should be increased to compensate for underexposure, or decreased to compensate for overexposure. Alternatively, the analyzer/classifier can extract fewer parameters or additional parameters, use other combinations of parameters, or use other criteria for classifying images.

Figure 5:
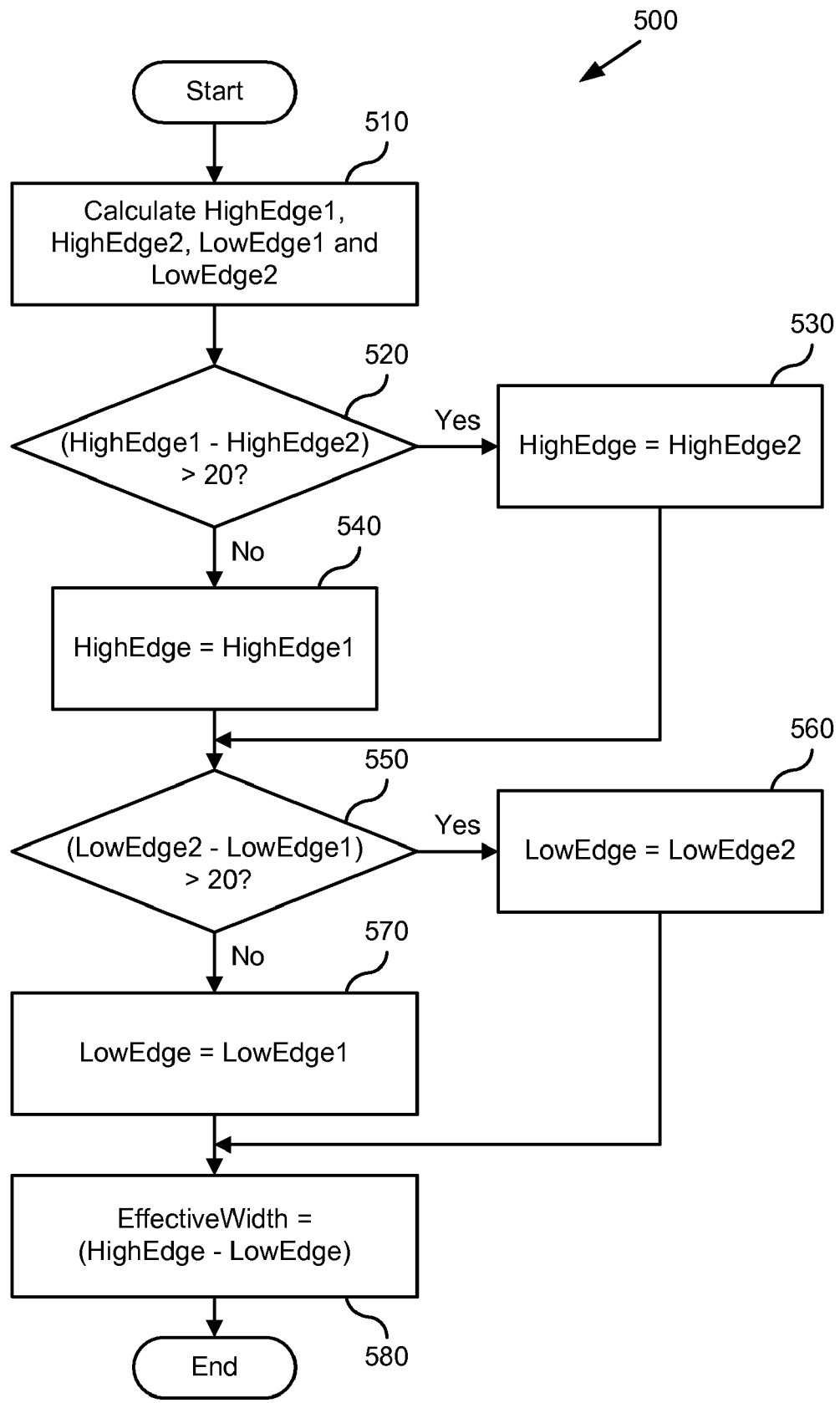
FIG. 5 is a flow diagram showing a calculation of the effective width of a luminance histogram during analysis and classification of a digital image.
Figure 6:
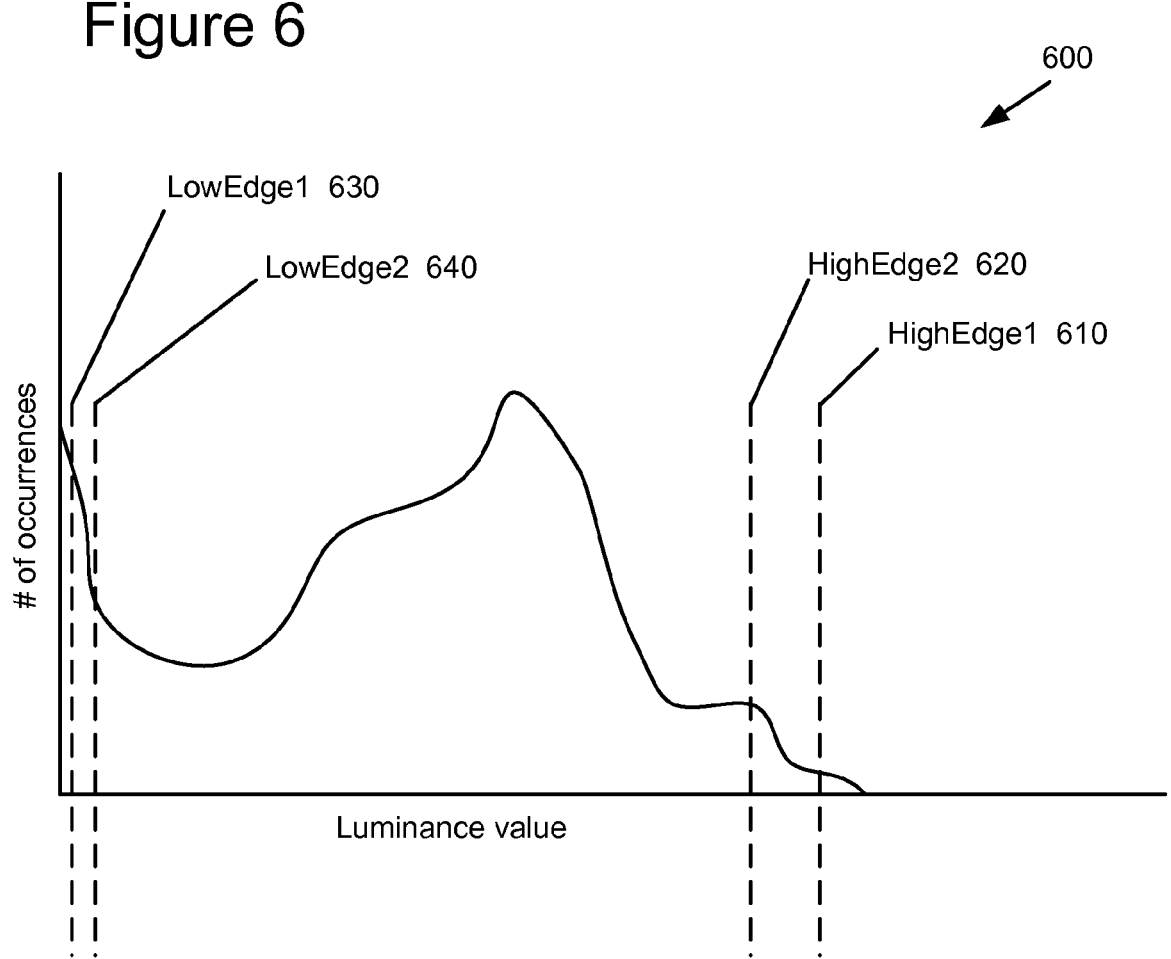
FIGS. 6 and 7 are graphs showing bounding points and parameters for analyzing a digital image luminance histogram.

With reference to FIG. 5, in some embodiments, the analyzer/classifier calculates the effective width of the histogram using technique 500. First, at 510, the analyzer/classifier finds edges (or bounding points) on the histogram by looping through the histogram. As shown in FIG. 6, the analyzer/classifier finds the position of high edges and low edges in histogram 600. In some embodiments, the analyzer/classifier finds edges by calculating the percentage of luminance values that are less than the luminance value at a given edge position. For example, 99% of the luminance values in the histogram are less than the luminance value at edge position 610 (HighEdge1), and 95% are less than the value at edge position 620 (HighEdge2). In contrast, 1% of the luminance values in the histogram are less than the luminance value at edge position 630 (LowEdge1), and 5% are less than the value at edge position 640 (LowEdge2).

Next, the analyzer/classifier computes high and low bounding points on the histogram (HighEdge and LowEdge) by comparing HighEdge1 with HighEdge2, and LowEdge1 with LowEdge2. The analyzer/classifier chooses an edge position based on whether the difference between the luminance values at the two edge positions (i.e., the "distance") indicates isolated intensity at the upper or lower end of the luminance value range. At 520, the analyzer/classifier compares HighEdge1 and HighEdge2. In one embodiment, if the distance is more than 20, the analyzer/classifier sets HighEdge to be equal to HighEdge2 (530). Otherwise, the analyzer/classifier sets HighEdge to be equal to HighEdge1 (540). Then, at 550, if the distance between LowEdge1 and LowEdge2 is more than 20, the analyzer/classifier sets LowEdge to be equal to LowEdge2 (560). Otherwise, the analyzer/classifier sets LowEdge to be equal to HighEdge1 (570).

Finally, at 580, the analyzer/classifier calculates the effective width of the histogram according to Equation 1:

$$\text{Effective Width} = \text{HighEdge} - \text{LowEdge} \quad (1)$$

Figure 7:
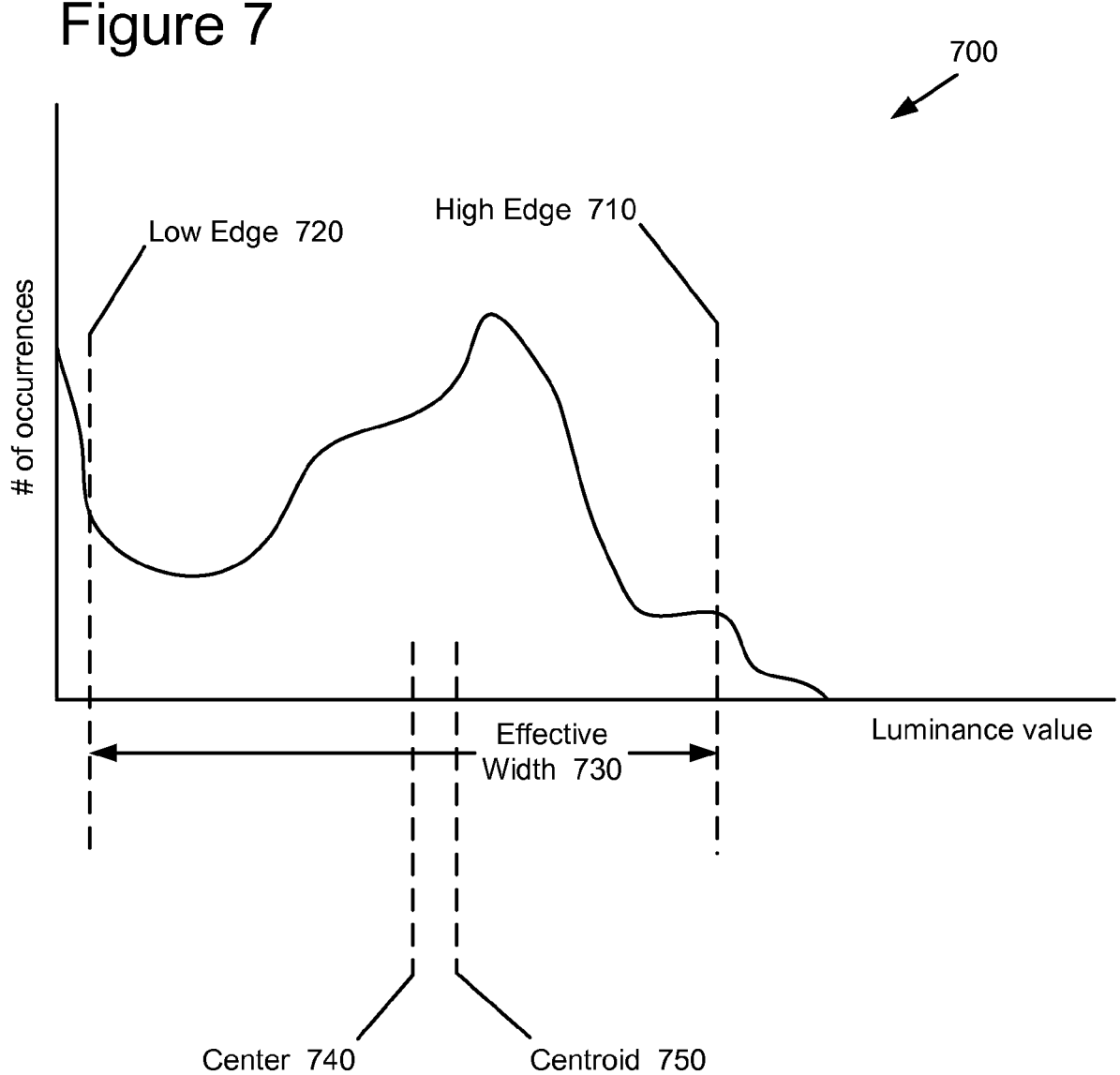

FIG. 7 shows a histogram 700 where the analyzer/classifier has calculated LowEdge 710, HighEdge 720 and EffectiveWidth 730.

The analyzer/classifier also calculates two other parameters useful for determining whether an image is underexposed or overexposed: Center and Centroid. For histogram 700, Center is at position 740 and Centroid is at position 750. The analyzer/classifier calculates Center using Equation 2:

$$\text{Center} = (\text{HighEdge} - \text{LowEdge})/2 \quad (2)$$

and calculates Centroid using Equation 3:

$$\text{Centroid} = \frac{\sum_{x=0}^{MaxLevel} (\text{Histogram}(x) * x)}{\sum_{x=0}^{MaxLevel} \text{Histogram}(x)} \quad (3)$$

where MaxLevel is the maximum luminance value in the histogram (e.g., 255 for 8-bit color depth), and Histogram(x) is the number of occurrences for luminance value x.

In other embodiments, the analyzer/classifier uses other techniques to calculate parameters. The analyzer/classifier can calculate the effective width of the histogram by using other criteria for choosing bounding points on the histogram. For example, the analyzer/classifier can use edge positions where different percentages of the luminance values in the histogram are less than the luminance values at the edge positions (e.g., 80% for a high edge position and 20% for a low edge position). The analyzer/classifier can also calculate parameters such as Center and Centroid using alternative techniques.

2. Image Classification

Figure 8:
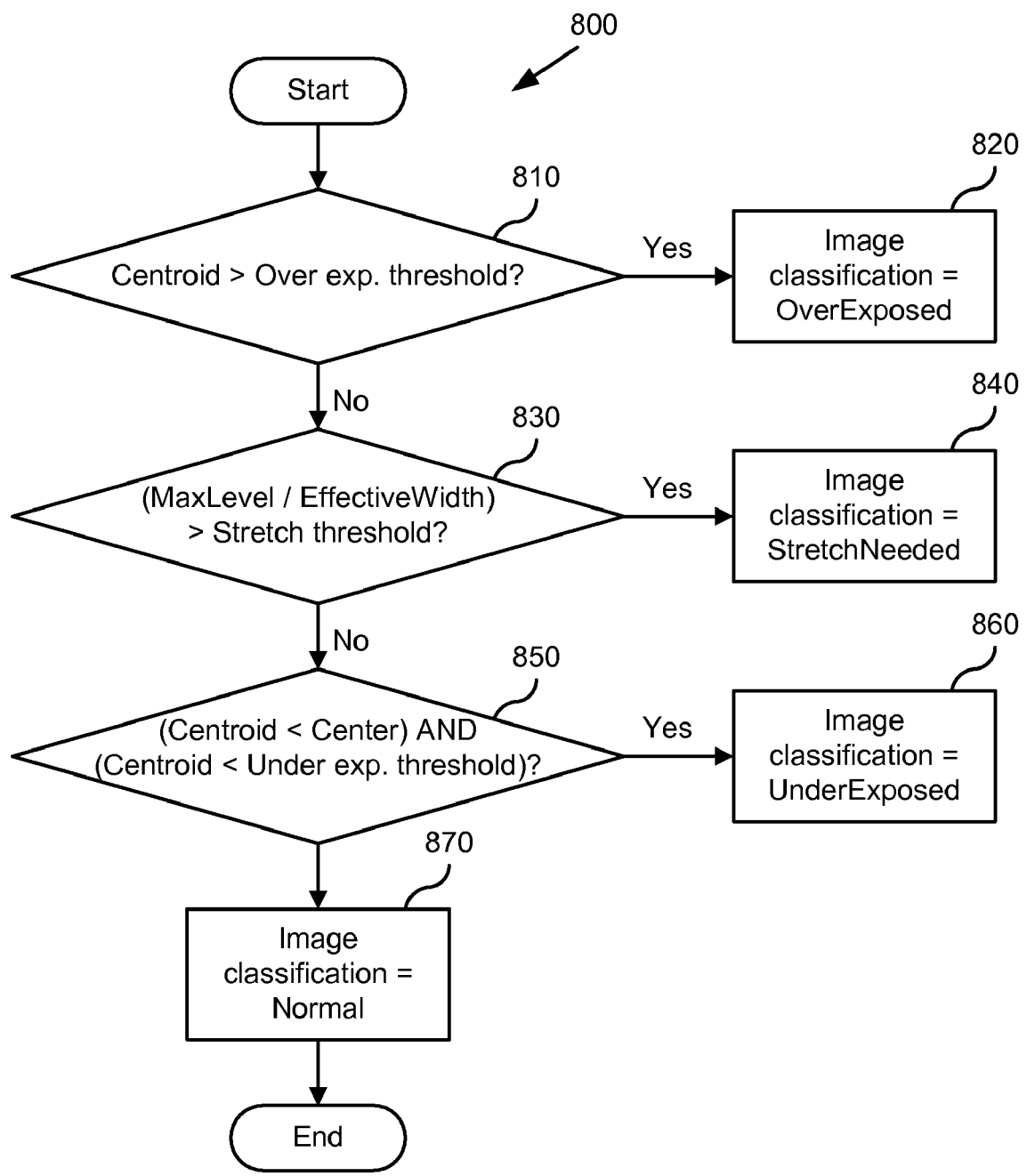
FIG. 8 is a flow diagram showing classification of digital images based on analysis of a luminance histogram.

FIG. 8 shows a technique 800 in which the analyzer/classifier classifies the image based on parameters (e.g., Center, Centroid and EffectiveWidth) extracted through analysis of the luminance histogram for the image. Although specific parameters and threshold values (determined experimentally) are given below as examples, in other embodiments, the analyzer/classifier uses other thresholds or parameters to determine image classifications. For example, if the maximum level of the luminance values is greater than 255, the analyzer/ classifier can use different thresholds. Alternatively, the analyzer/classifier uses other criteria for determining classifications of images.

The technique shown in FIG. 8 proceeds according to the following pseudo code:

```
if Centroid > OVEREXPOSURE_THRESHOLD
    then image is OverExposed
else if (MaxLevel / EffectiveWidth) > STRETCH_THRESHOLD
    then image is StretchNeeded
else if (Centroid < Center) and (Centroid <
UNDEREXPOSURE_THRESHOLD)
    then image is UnderExposed
else image is Normal
```

At 810, the analyzer/classifier first checks whether the image is overexposed by checking whether the luminance value at the Centroid position for the histogram is greater than an overexposure threshold luminance value. In one embodiment, the overexposure threshold is 200. If the luminance value at the Centroid position in the histogram is greater than the overexposure threshold, then, at 820, the image classification is set to OverExposed.

If the luminance value at the Centroid position is less than the overexposure threshold, the analyzer/classifier checks whether the luminance histogram should be stretched by checking, at 830, whether MaxLevel/EffectiveWidth is greater than a stretch threshold. In one embodiment, the stretch threshold is 2.618. If MaxLevel/EffectiveWidth is greater than the stretch threshold, the image classification is set to StretchNeeded at 840.

If MaxLevel/Effective Width is less than the stretch threshold, the analyzer/classifier checks whether the image is underexposed. At 850, if the luminance value at the Centroid position is less than both the value at the Center position and an underexposure threshold, the image classification is set to UnderExposed at 860. If not, the image classification is set to Normal at 870. In one embodiment, the underexposure threshold is 98.

B. Exposure Compensation

Referring again to FIG. 3, an exposure compensator 350 performs exposure compensation on an image based on the image classification in order to adjust the exposure of the image. The exposure compensator takes classification data 340 from the exposure analyzer/classifier 330 and produces compensation transform data 360. In some embodiments, the exposure compensator performs exposure compensation by adjusting luminance value for pixels in the image according to the technique 900 shown in FIG. 9. Alternatively, the exposure compensator performs exposure compensation in the image using other techniques. For example, the exposure compensator can perform transforms other than or in addition to those described below (e.g., linear transforms or non-linear transforms) based on the classification of an image. The exposure compensator also can choose to perform no adjustment or different degrees of adjustment on the exposure of images depending on implementation.

1. Adjustments for "Stretchneeded" Images

Figure 9:
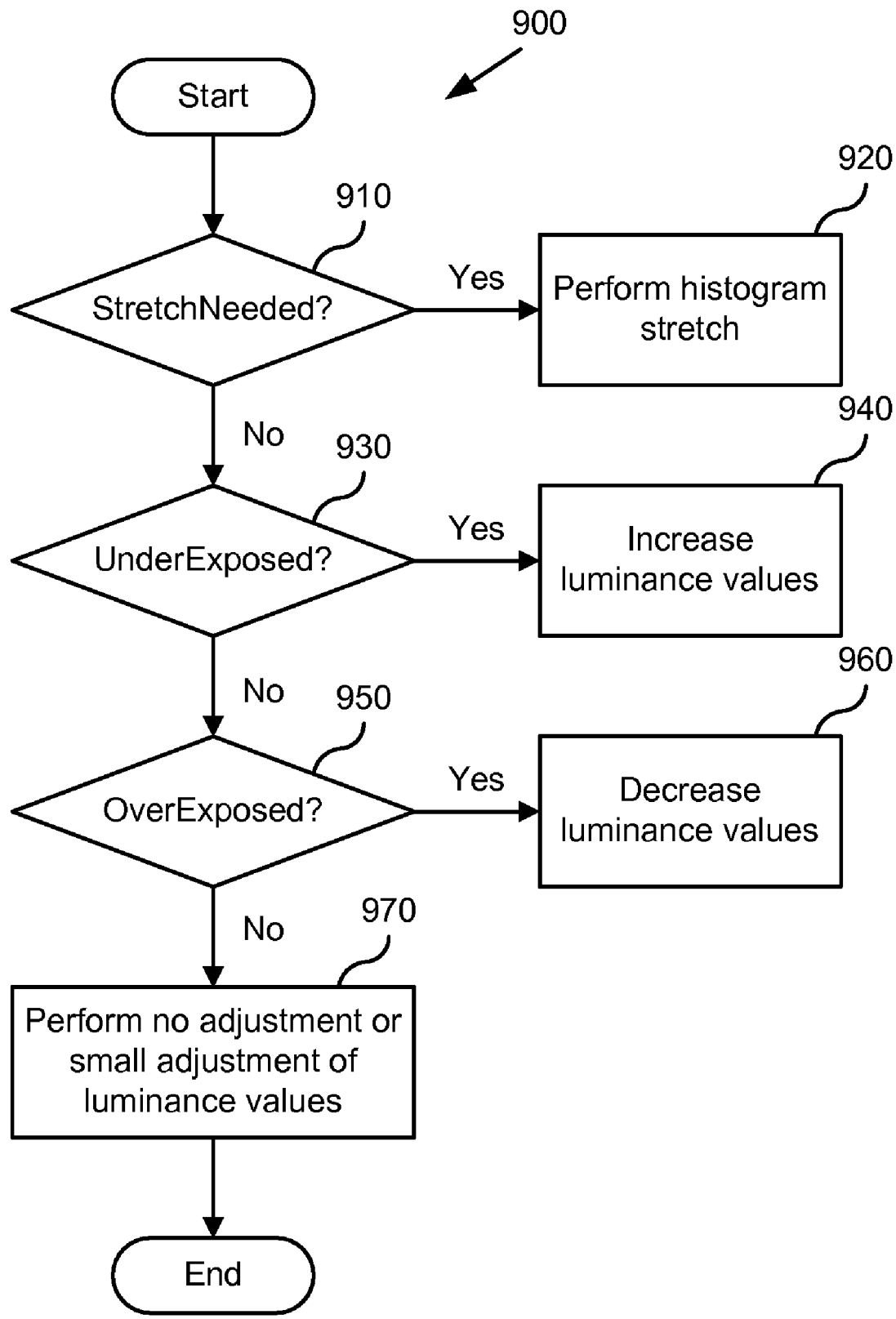
FIG. 9 is a flow diagram showing selection of exposure compensation techniques based on classification of digital images.

Referring to FIG. 9, at 910, the exposure compensator checks whether the image classification is StretchNeeded. If so, the exposure compensator performs a histogram stretch on the luminance histogram of the image at 920.

In some embodiments, to perform a histogram stretch, the exposure compensator uses the parameters Center (see Equation 2) and Scale. Scale is calculated as shown in Equation 4:

$$\text{Scale} = \text{MaxLevel} / \text{Effective Width} \quad (4)$$

(see Equation 1 and FIG. 5 for the calculation of the EffectiveWidth parameter). The exposure compensator maps the luminance value Y for each pixel to the adjusted value Y' according to Equation 5:

$$Y' = \text{Scale} * (Y - \text{Center}) + \frac{\text{MaxLevel}}{2}. \quad (5)$$

Alternatively, the exposure compensator uses other techniques to perform a histogram stretch.

2. Adjustments for Underexposed Images

Referring again to FIG. 9, if the image classification is not StretchNeeded, the exposure compensator checks whether the image classification is UnderExposed at 930. If so, the exposure compensator increases luminance values for the image at 940.

The human eye is more sensitive to mid-tone luminance values (the luminance values between the high and low end of the range) than to higher or lower luminance values. In many underexposed images, a mid-tone luminance channel boost yields satisfactory results. Applying a positive gamma curve to luminance values in an image tends to change mid-tone luminance values at a greater rate than higher or lower luminance values. Therefore, in some embodiments, the exposure compensator increases luminance values by applying a positive gamma curve correction to the pixels in the image. The exposure compensator maps the luminance value Y for each pixel to a new value Y' as shown in Equation 6:

$$Y' = \text{MaxLevel} * \left(1 - \left(\frac{\text{MaxLevel} - Y}{\text{MaxLevel}}\right)^{\text{Gamma}}\right). \quad (6)$$

A "positive" gamma curve is a gamma curve where, when Gamma is selected to be greater than one; the mapping will in effect provide an increase in the mid-tone values of the pixels. In one embodiment, the exposure compensator applies a positive gamma curve with gamma equal to 1.8. Alternatively, the exposure compensator performs some other adjustment on underexposed images, such as a linear transform or some other non-linear transform.

3. Adjustments for Overexposed Images

If the image classification is not UnderExposed, then, at 950, the exposure compensator checks whether the image classification is OverExposed. If so, the exposure compensator decreases luminance values for the image at 960. In some embodiments, the exposure compensator applies a gradual brightness reduction approach. This approach is a negative gamma curve, as described in Equation 7:

$$Y' = \text{MaxLevel} * \left(\frac{Y}{\text{MaxLevel}}\right)^{\frac{1}{\text{Gamma}}}. \quad (7)$$

A "negative" gamma curve is a gamma curve where, when 1/Gamma is less than one; the luminance values for the pixels will gradually decrease in the values of the pixels, especially in the high-brightness region. In one embodiment, the exposure compensator applies a negative gamma curve with Gamma equal to 2.5 (1/Gamma=0.4). Alternatively, the exposure compensator performs some other adjustment on overexposed images, such as a linear transform or some other non-linear transform.

4. Adjustments for "Normal" Images

Finally, at 970, if the image classification is not StretchNeeded, UnderExposed, or OverExposed, then the image classification is Normal. For Normal images, the exposure compensator performs a small adjustment of the luminance values for the pixels in the image, or performs no adjustment at all. In some embodiments, a small adjustment for Normal images is initiated by user interaction (e.g., a user directs the exposure compensator to apply a positive gamma curve with small gamma to boost the mid-tone).

5. Examples

FIGS. 10-17 illustrate examples of exposure compensation performed by the exposure compensator.

Figure 10:
FIG. 10 depicts an image classified as StretchNeeded.
Figure 11:
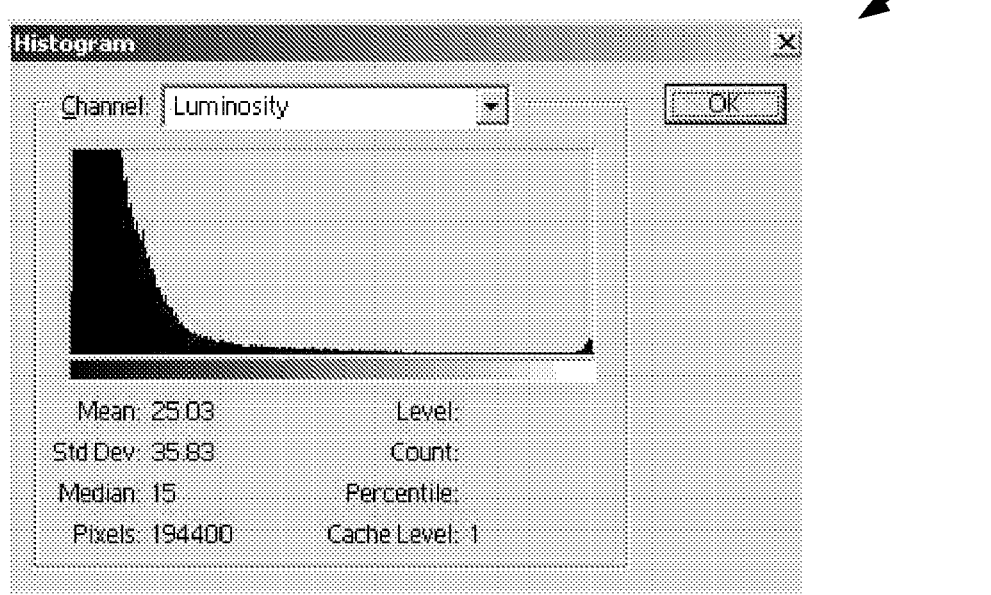
FIG. 11 is a luminance histogram for the image depicted in FIG. 10.
Figure 12:
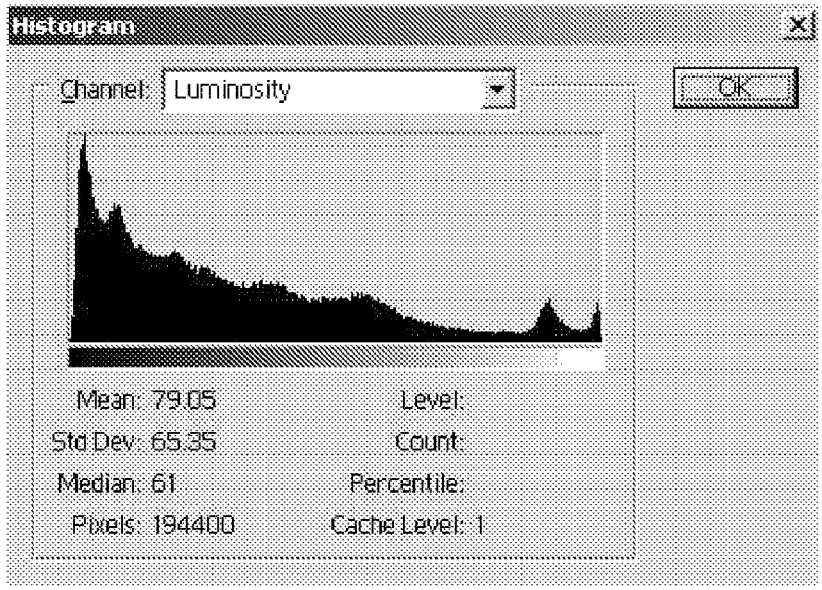
FIG. 12 is a luminance histogram depicting results of a histogram stretch performed on the luminance histogram of FIG. 11.
Figure 13:
FIG. 13 depicts an image produced via the histogram stretch depicted in FIG. 12.

FIG. 10 depicts an image 1000 classified as StretchNeeded. FIG. 11 shows the luminance histogram for the image depicted in FIG. 10. As can be seen in FIG. 11, the frequency of luminance values for the image depicted in FIG. 10 is concentrated in the low end of the range. The exposure compensator performs a histogram stretch so that the luminance values are more evenly distributed across the range. The stretched histogram is shown in FIG. 12. The image depicted in FIG. 13 shows the results of the histogram stretch; the exposure compensator has improved the quality of the original image.

Figure 14:
FIG. 14 depicts an image classified as UnderExposed.
Figure 15:
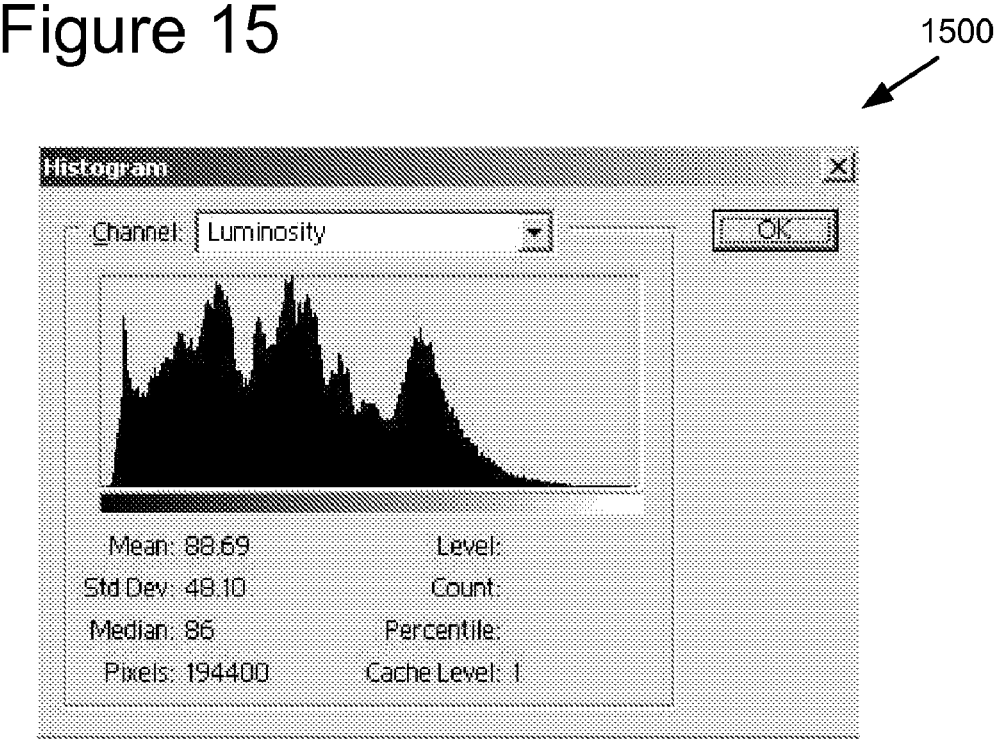
FIG. 15 is a luminance histogram for the image depicted in FIG. 14.
Figure 16:
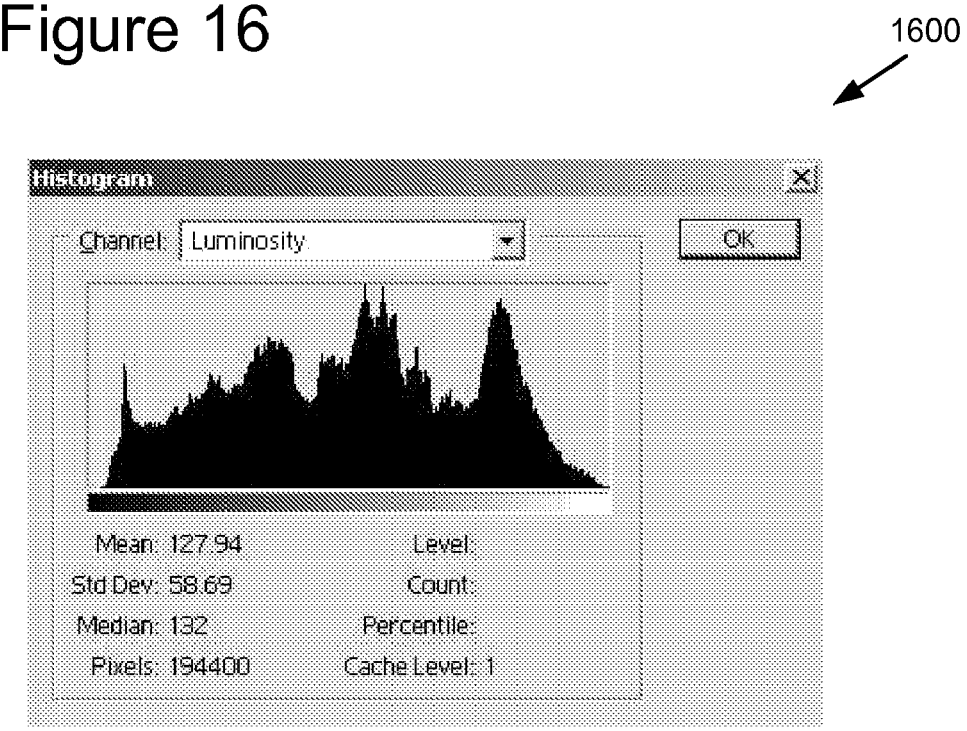
FIG. 16 is a luminance histogram depicting results of a positive gamma correction performed on the luminance histogram of FIG. 15.
Figure 17:
FIG. 17 depicts an image produced via the positive gamma correction depicted in FIG. 16.

FIG. 14 depicts an image 1400 classified as UnderExposed. FIG. 15 shows the luminance histogram for the image depicted in FIG. 14. The exposure compensator applies a positive gamma curve to the luminance histogram shown in FIG. 15 so that the luminance values are now shifted towards the brighter end of the range. The "shifted" histogram is shown in FIG. 16. The image depicted in FIG. 17 shows the results of the histogram stretch; the exposure compensator has improved the quality of the original image.

C. Performance Optimization

Since the described exposure compensation techniques are performed on individual pixels, with no need to buffer neighboring pixels, some embodiments employ one or more of the following performance optimization techniques.

First, any compensation transform can be stored in a lookup table (LUT). When reading an image file for an exposure-compensated image, no repeated computation will be needed for each pixel. To read exposure-compensated pixel values, an application reading the file will only need to go through the LUT to read out the new values for each pixel in the image. Storing exposure compensation transforms in the LUT allows the compensation transform data to be saved with a compressed version of the image, and allows an application reading the image file containing the LUT to stay in the compressed domain, avoiding the need to decompress and then recompress the image.

Second, LUTs can be stored as color tables in image files. Therefore, no calculation is needed until image rendering time. This approach preserves the original image (i.e., the "digital negative") of the image and provides an optimized rendering (to display or to printer) at the same time.

Third, the creation of a LUT based on the technology described above is based on the image's luminance histogram. If this histogram already exists in the image metadata (either created by a digital camera or through the image acquisition process), or if the histogram can be generated without having to decompress the image in certain compression schemes, then the automatic exposure analysis and adjustment process can be even faster.

Figure 18:
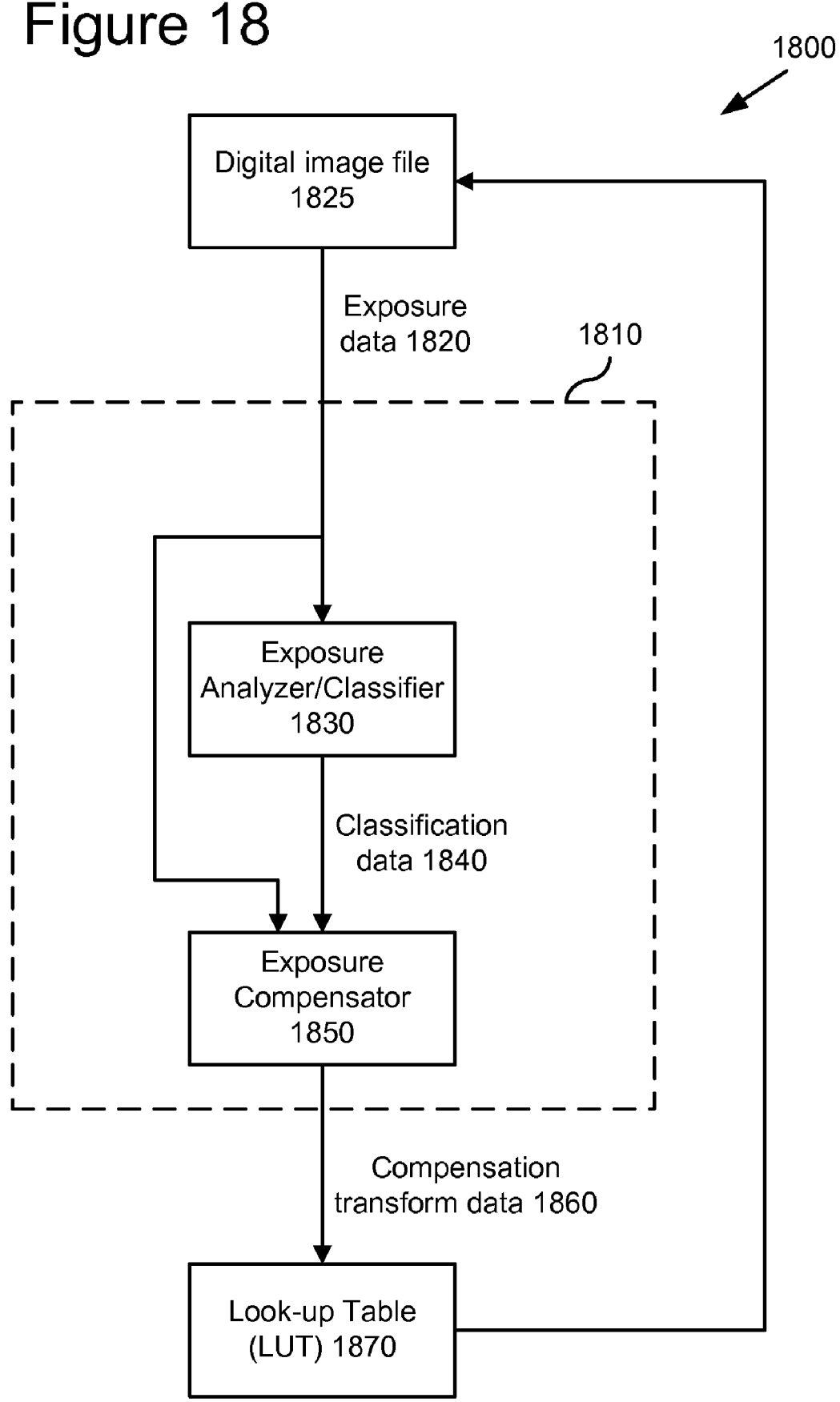
FIG. 18 is a block diagram of an automatic exposure analysis and adjustment software architecture capable of storing exposure compensation transform data for a digital image in a look-up table in a digital image file.

FIG. 18 shows a software architecture of an automatic exposure analysis and adjustment system 1800 capable of performing the performance optimization techniques described above. An automatic image analysis and adjustment module 1810 analyzes exposure data 1820 (i.e., luminance values) for a digital image from digital image file 1825 in exposure analyzer/classifier 1830, which classifies the digital image and provides classification data 1840 to exposure compensator 1850. The exposure compensator 1850 selects an appropriate technique for adjusting the luminance values for the digital image, performs the adjustment and outputs the results as compensation transform data 1860. In this architecture, the automatic image analysis and adjustment module 1810 stores compensation transform data 1860 in LUT 1870, and stores LUT 1870 back into the digital image file 1825.

Figures 19, 20:
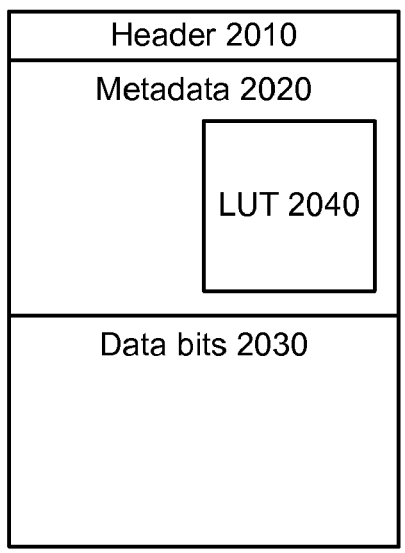
FIG. 19 is a table showing input luminance values and output luminance values in a look-up table.
FIG. 20 is a block diagram showing a digital image file containing a look-up table.

In some embodiments, the LUT is arranged in a format such as that shown in FIG. 19. FIG. 19 shows a LUT 1900 comprising input luminance values 1910 and output values 1920. LUT 1900 contains input values and output values for an image to which a positive gamma curve has been applied. The LUT in FIG. 19 shows 256 input values and output values. However, in images with more or less than 256 possible luminance values, the LUT can be modified accordingly to accommodate another number of possible values. While some input luminance values may not change, other input values may be adjusted to compensate for exposure problems in the image. For example, in LUT 1900, the output value for input value 0 is 0, and the output value for input value 255 is 255. However, the output value for mid-tone input value 79 is 144. Alternatively, the input values can be adjusted in some other way (e.g., histogram stretch, positive gamma curve, or negative gamma curve), or the LUT can be arranged in some other format.

As mentioned above, an automatic analysis and adjustment module can store a LUT containing exposure compensation transform data in a digital image file. FIG. 20 shows an image file 2000 comprising a header 2010, metadata 2020 and data bits 2030. LUT 2040 is stored in metadata 2020. Alternatively, the LUT can be stored in other locations within the digital image file or outside the digital image file.

D. Implementation as Operating System Features

The tools and techniques described above can be implemented as plug-in modules for applications or as stand-alone applications, but they can also be implemented as operating system features. With an operating system that includes one or more of the described tools and techniques, users can take advantage of automatic exposure analysis and adjustment without using additional applications. For example, by storing compensation transform data in image files according to some of the described embodiments, users will be able to ensure that digital images processed using the automatic analysis and adjustment features will be viewed uniformly, and will be able to adjust the exposure of digital images without changing the original data bits for the images.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method performed by a computer configured as a digital image adjustment computer of processing a digital image, the method comprising:
   with the computer configured as the digital image adjustment computer, adjusting exposure data for the digital image, wherein the exposure data comprises luminance values represented in a luminance value histogram for pixels in the digital image, and wherein adjusting the exposure data comprises:
      selecting between performing an adjustment for distribution of histogram values, an adjustment for underexposure, and an adjustment for overexposure; and performing the selected adjustment;
   with the computer configured as the digital image adjustment computer, producing exposure adjustment data for the digital image based on the adjusting;
   with the computer configured as the digital image adjustment computer, storing the exposure adjustment data in a look-up table; and
   with the computer configured as the digital image adjustment computer, storing the look-up table in a digital image file, wherein the storing the look-up table in the digital image file facilitates archiving an original version of the digital image
   wherein performing the adjustment for distribution of histogram values comprises:
      determining a MaxLevel parameter as a maximum luminance value in the histogram;
      determining a Scale parameter associated with the histogram;
      determining a Center parameter associated with the histogram; and
      performing a histogram stretch on the histogram, wherein the histogram stretch comprises mapping the luminance value Y of each pixel in the digital image to a new luminance value Y' according to the following equation:

$$Y' = Scale * (Y - Center) + \frac{MaxLevel}{2};$$

wherein performing the adjustment for underexposure comprises:
      determining the MaxLevel parameter; and
      applying a positive gamma curve with a Gamma parameter to the histogram to increase luminance values, wherein the applying the positive gamma curve comprises mapping the luminance value Y of each pixel in the digital image to a new luminance value Y' according to the following equation:

$$Y' = MaxLevel * \left(1 - \left(\frac{MaxLevel - Y}{MaxLevel}\right)^{Gamma}\right);$$

and
   wherein performing the adjustment for overexposure comprises:
      determining the MaxLevel parameter; and
      applying a negative gamma curve with a Gamma parameter used to decrease luminance values to the histogram, wherein the applying the negative gamma curve comprises mapping the luminance value Y of each pixel in the digital image to a new luminance value Y' according to the following equation:

$$Y' = MaxLevel * \left(\frac{Y}{MaxLevel}\right)^{\frac{1}{Gamma}}.$$

2. The method of claim 1 wherein data representing the luminance value histogram is present in the digital image file prior to the adjusting.

3. The method of claim 2 wherein adjusting the exposure data for the digital image further comprises:
   with the computer configured as the digital image adjustment computer, analyzing exposure data for the digital image; and
   with the computer configured as the digital image adjustment computer, assigning an image classification to the digital image based on the analyzing, comprising:
      1) calculating a center position of the digital image
      2) calculating a centroid position of the digital image;
      3) calculating effective width of the digital image;
      4) using the center position, centroid position, and effective width to assign
   the image classification as Underexposed, Overexposed, StretchNeeded, or Normal; and
   with the computer configured as the digital image adjustment computer, selecting an exposure compensation technique for the digital image based on the assigning.

4. The method of claim 3 further comprising:
   with the computer configured as the digital image adjustment computer, extracting the Centroid and the MaxLevel parameter from the luminance value histogram, wherein the MaxLevel parameter is maximum luminance value in the luminance value histogram, and the Centroid is calculated using the equation $$Centroid = \frac{\sum_{x=0}^{MaxLevel} (Histogram(x) * x)}{\sum_{x=0}^{MaxLevel} Histogram(x)}$$

wherein Histogram (x) is number of occurrences of luminance value x.

5. The method of claim 4 wherein if luminance value of the digital image at the centroid position is less than luminance value of the digital image at the center position, and if the luminance value at the centroid position is less than an underexposure threshold, then, with the computer configured as the digital image adjustment computer, assigning the image classification of Underexposed.

6. The method of claim 3 wherein if luminance value of the digital image at the centroid position is greater than an overexposure threshold then, with the computer configured as the digital image adjustment computer, assigning the image classification of Overexposed.

7. The method of claim 1 wherein the lookup table is stored in a metadata section of the digital image file.

8. The method of claim 1 wherein the digital image file comprises a compressed version of the digital image, and wherein the original version of the digital image is readable in a compressed domain.

9. The method of claim 8 wherein the luminance value histogram is generated without decompressing the compressed version of the digital image.

10. A computer system for processing digital images, the computer system comprising:
   means for adjusting exposure data comprising luminance values represented in a luminance value histogram for pixels in the digital image, the means for adjusting comprising:
   1) means for calculating center position, centroid position, and effective width; and
   2) means for using the center position, the centroid position, and the effective width to assign an image classification as Underexposed, Overexposed, StretchNeeded, or Normal;
   means for selecting an exposure compensation technique for the digital image based on the image classification;
   means for producing adjustment data for the digital image based on the selected exposure compensation technique;
   means for storing the adjustment data in a look-up table; and
   means for storing the look-up table in a digital image file, wherein the storing the look-up table in the digital image file facilitates archiving an original version of the digital image;
   wherein the means for producing adjustment data comprises means for performing an adjustment for distribution of histogram values, means for performing an adjustment for underexposure, and means for performing an adjustment for overexposure;
   wherein the means for performing the adjustment for distribution of histogram values comprises:
      means for determining a MaxLevel parameter as a maximum luminance value in the histogram;
      means for determining a Scale parameter associated with the histogram;
      means for determining a Center parameter associated with the histogram; and
      means for performing a histogram stretch on the histogram, wherein the histogram stretch comprises mapping the luminance value Y of each pixel in the digital image to a new luminance value Y' according to the following equation:

$$Y' = Scale * (Y - Center) + \frac{MaxLevel}{2};$$

wherein the means for performing the adjustment for underexposure comprises:
      means for determining the MaxLevel parameter; and
      means for applying a positive gamma curve with a Gamma parameter to the histogram to increase luminance values, wherein the applying the positive gamma curve comprises mapping the luminance value Y of each pixel in the digital image to a new luminance value Y' according to the following equation:

$$Y' = MaxLevel * \left(1 - \left(\frac{MaxLevel - Y}{MaxLevel}\right)^{Gamma}\right);$$

and
   wherein the means for performing the adjustment for overexposure comprises:
      means for determining the MaxLevel parameter; and
      means for applying a negative gamma curve with a Gamma parameter used to decrease luminance values to the histogram, wherein the applying the negative gamma curve comprises mapping the luminance value Y of each pixel in the digital image to a new luminance value Y' according to the following equation:

$$Y' = MaxLevel * \left(\frac{Y}{MaxLevel}\right)^{\frac{1}{Gamma}}.$$

11. The computer system of claim 10 further comprising means for extracting the centroid position from the luminance value histogram.

12. The computer system of claim 11 wherein the centroid position is calculated using the equation $$Centroid = \frac{\sum_{x=0}^{MaxLevel} (Histogram(x) * x)}{\sum_{x=0}^{MaxLevel} Histogram(x)}$$

and wherein Histogram (x) is number of occurrences of luminance value x in the luminance value histogram.

* * * * *